United States Patent

Nose

Patent Number: 5,889,208
Date of Patent: Mar. 30, 1999

[54] ANGULAR VELOCITY SENSOR HAVING CANTILEVER BEAMS

[75] Inventor: Hiroyasu Nose, Zama, Japan

[73] Assignee: Canon Kabushiki Kaisha, Tokyo, Japan

[21] Appl. No.: 461,762

[22] Filed: Jun. 5, 1995

Related U.S. Application Data

[63] Continuation of Ser. No. 985,157, Dec. 3, 1992, abandoned.

[30] Foreign Application Priority Data

Dec. 6, 1991 [JP] Japan .................... 3-349152

[51] Int. Cl.$^6$ .................................................. G01P 9/04
[52] U.S. Cl. ................................. 73/504.16; 73/504.12
[58] Field of Search .................... 73/504.16, 504.15, 73/504.12, 510, 504.04, 504.14; 338/2, 5; 310/329, 342, 370

[56] References Cited

U.S. PATENT DOCUMENTS

| | | | |
|---|---|---|---|
| 3,206,986 | 9/1965 | Christensen | 73/504.16 |
| 3,460,396 | 8/1969 | Fillod et al. | 73/584.16 |
| 3,839,915 | 10/1974 | Schlitt | 73/505 |
| 4,750,364 | 6/1988 | Kawamura et al. | 73/517 AV |
| 4,791,815 | 12/1988 | Yamaguchi et al. | 73/505 |
| 4,836,023 | 6/1989 | Oikawa | 73/504.12 |
| 4,848,157 | 7/1989 | Kobayashi | 73/577 R |
| 4,899,587 | 2/1990 | Staudte | 73/505 |
| 4,930,351 | 6/1990 | Macy et al. | 73/505 |
| 5,081,867 | 1/1992 | Yamada | 73/577 R |
| 5,166,571 | 11/1992 | Konno et al. | 73/504.16 |
| 5,226,324 | 7/1993 | Oikawa | 73/504.12 |

FOREIGN PATENT DOCUMENTS

61-139719  6/1986  Japan .

*Primary Examiner*—Christine K. Oda
*Attorney, Agent, or Firm*—Fitzpatrick, Cella, Harper & Scinto

[57] ABSTRACT

An angular velocity sensor comprises a substrate, a vibrating member of an elongate plate formed by processing a part of the substrate, a support beam formed by processing a part of the substrate to support a center of the vibrating member in a longitudinal direction thereof, a driving device for driving both longitudinal ends of the vibrating member to vibrate in a first direction, and a detecting device for detecting vibrations of the vibrating member in a second direction perpendicular to the first direction thereby to detect an angular velocity of rotation of the substrate.

16 Claims, 6 Drawing Sheets

ANGULAR VELOCITY SENSOR HAVING CANTILEVER BEAMS

This application is a continuation of application Ser. No. 07/985,157, filed Dec. 3, 1992, now abandoned.

BACKGROUND OF THE INVENTION

1. Field of the Invention

The present invention relates to an angular velocity sensor for detecting an angular velocity by utilizing occurrence of a Coriolis force corresponding to the angular velocity of rotation of a vibrator in a direction perpendicular to a vibrating direction of the vibrator when the vibrating vibrator is rotated.

2. Related Background Art

Since a mechanical rotating top rate gyroscope is large and expensive, there has been developed an angular velocity sensor for public use as called as a piezoelectric gyroscope or oscillation gyroscope which is effective in power savings, longer in life, and suitable for decrease in size.

FIG. 1 is a perspective view to show a conventional angular velocity sensor comprising such an oscillation gyroscope. A vibration piece for detection 4 is mounted through a coupling member 3 above a vibration piece 2 fixed on a base 1, while a vibration piece for detection 7 is mounted through a coupling member 6 above a vibration piece 5 similarly. There are provided on the vibration piece 2 a piezoelectric element drive 8 vibrating the vibration piece 2 in the X-direction and a piezoelectric element for monitor 9 for monitoring actual vibrations of the vibration piece 2. Also, a piezoelectric element detector 10 is provided on the vibration piece for detection 4 to detect vibrations in the Y-direction. Similarly, a piezoelectric element drive 11 and a piezoelectric element monitor 12 are provided on the vibration piece 5, and a piezoelectric element detector 13 is on the vibration piece for detection 7.

In the above arrangement, while the vibration pieces 2, 5 are vibrating at a resonance frequency $\omega 1$ with a constant amplitude as opposing to each other in the X-direction, and when the vibration pieces 2, 5 are rotated together with the base 1 at an angular velocity $\Omega$ about the Z-axis, a Coriolis force Fc proportional to the angular velocity $\Omega$ acts on the vibration pieces for detection 4, 7 to vibrate the vibration pieces for detection 4, 7 at the resonance frequency $\omega 1$. Since an amplitude of the vibrations of the vibration pieces for detection 4, 7 is proportional to the angular velocity $\Omega$, the angular velocity $\Omega$ may be obtained by detecting the amplitude of the vibrations by the piezoelectric elements for detection 10, 13. In the detection, in order to keep the amplitude of the vibration pieces 2, 5 constant, the amplitude is detected by the piezoelectric elements monitor 9, 12 and the detected amplitude is fed back to each drive signal of the piezoelectric element drives 8, 11.

The above-described conventional example, However, includes a drawback of an inability of increase in detection precision of angular velocity because the resonance frequency would be deviated and the attenuation property would be distributed unless the work and assembly precision of the vibration pieces 2, 5 and the vibration pieces for detection 4, 7 should be high. In addition, since the parts are not integrally made, the assembly becomes complicated and the sensor cannot be made smaller or cheaper.

An angular velocity sensor free of the above drawbacks was proposed in Japanese Laid-open Patent Application No. 61-139719. FIG. 2 is an exploded perspective view to show a construction of the angular velocity sensor as disclosed. In FIG. 2, reference numeral 51 designates a substrate made of silicon, 52 a spacer, and 53 a support substrate made of silicon. A cantilever beam 50 is formed on the substrate 51 by etching. An electrode 54 is provided at a free end of the cantilever beam 50. An AC signal is applied from a generator 55 to the electrode 54 to vibrate the free end of the cantilever beam 50 in the Z-direction.

In FIG. 2, when the substrate 51 rotates about the Y-axis, the free end of the cantilever 50 is vibrated by a Coriolis force in the X-direction. Since an amplitude of the vibrations in the X-direction corresponds to an angular velocity of rotation, the angular velocity may be measured by detecting the vibrations by piezo resistance elements 56a and 56b mounted on the cantilever beam.

There appears, however, a force to vibrate the fixed end as a reaction to the vibrations at the free end in the arrangement of FIG. 2. This force is absorbed by a material of the substrate, and, therefore, the vibrations of the free end are attenuated by an amount as absorbed. Thus, the angular velocity sensor of FIG. 2 is not effective to generate the vibrations in the Z-direction, and has a loss in vibrations in the X-direction, resulting in a decrease in detectivity.

SUMMARY OF THE INVENTION

It is an object of the present invention to solve the above problems in the conventional sensors and to provide an angular velocity sensor which can be efficiently driven while having a high detectivity.

The object of the present invention can be achieved by an angular velocity sensor comprising a substrate, a vibrating member of an elongate plate formed by processing a part of the substrate, a support beam formed by processing a part of the substrate to support a center of the vibrating member in a longitudinal direction thereof, driving means for driving both longitudinal ends of the vibrating member to vibrate in first direction, and detecting means for detecting vibrations of the vibrating member in a second direction perpendicular to the first direction thereby to detect an angular velocity of rotation of the substrate.

The object of the invention can also be achieved by an angular velocity sensor comprising a substrate, a first cantilever beam formed by processing a part of the substrate and having a fixed end and a vibrating end supported capable of vibrating relative to the fixed end, a second cantilever beam formed by processing a part of the substrate and having a fixed end and a vibrating end supported capable of vibrating relative to the fixed end, the first and second cantilever beams being formed in symmetry with each other with a symmetry axis being on a fixed end side thereof, driving means for driving the vibrating ends of the first and second cantilevers to vibrate in a first direction, and detecting means for detecting vibrations of the first and second cantilever beams in a second direction perpendicular to the first direction thereby to detect an angular velocity of rotation of the substrate.

Since the angular velocity sensor according to the present invention is structured such that the both ends of the vibrator are vibrated and the vibrator is supported at the center thereof, forces generated by the reaction to the vibrations at both ends are balanced to cancel each other at the center to cause no loss of vibrations in the support portion. Therefore, the angular velocity sensor according to the present invention may efficiently generate vibrations while increasing the detectivity of angular velocity.

DETAILED DESCRIPTION OF THE PREFERRED EMBODIMENTS

The present invention will be explained in detail in accordance with embodiments as shown in FIG. 3 to FIG. 8.

Figure 3:
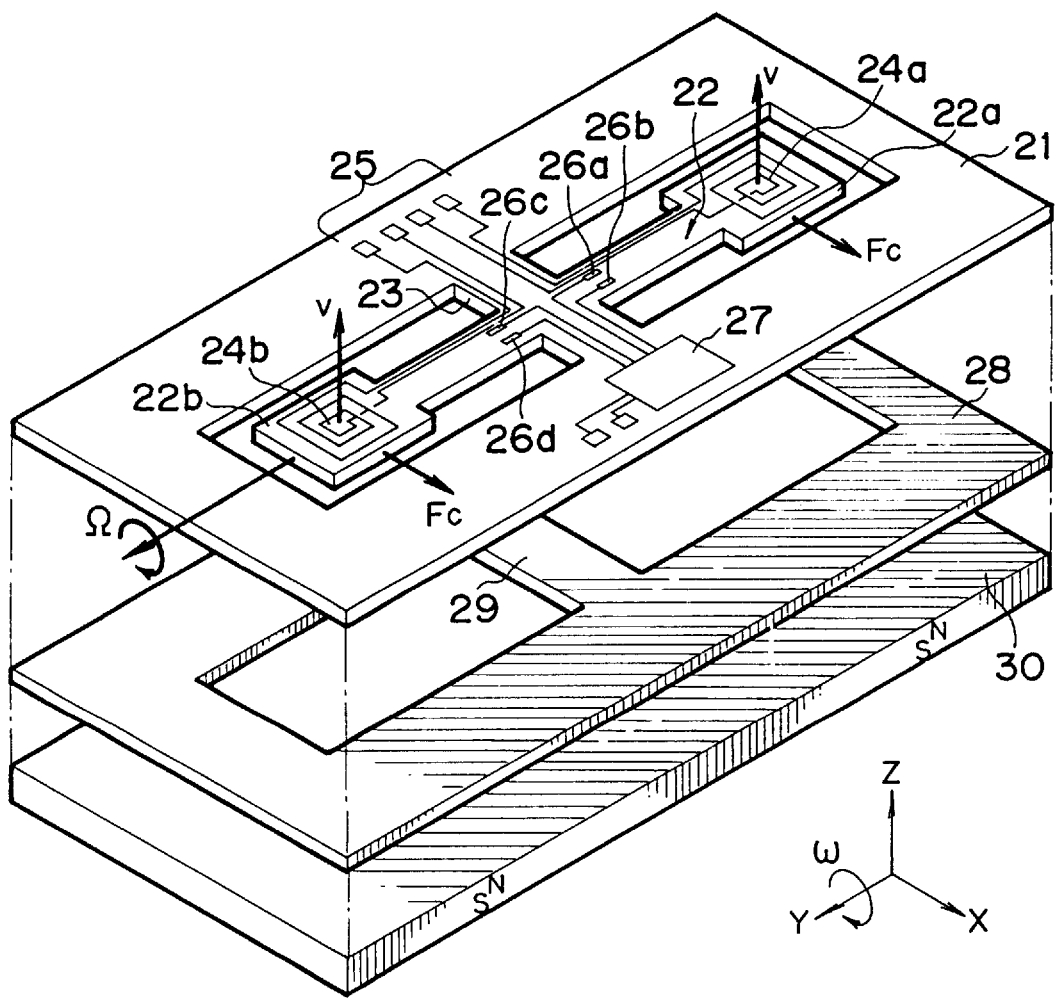
FIG. 3 is an exploded perspective view to show a first embodiment of an angular velocity sensor according to the present invention.

FIG. 3 is an exploded perspective view to show a first embodiment of the angular velocity sensor according to the present invention. In FIG. 3, a vibrator 22 and a support beam 23 are integrally formed on a vibrator substrate 21 made of a semiconductor substrate such as silicon by the photolithography and the anisotropic etching. The vibrator 22 comprises two sections 22a and 22b, and the central portion thereof is supported by the support beam 23. Coils for drive 24a and 24b are formed on either end portion of the vibrator 22 by photolithography patterning, which are led along above the support beam 23 to terminals 25. A diffused type strain gauge unit is formed in the central portion of the vibrator 22 by doping the silicon substrate with an impurity such as boron. In the strain gauge unit, a plurality of strain gauges 26a to 26d are incorporated in a bridge form to detect a strain as a change in voltage. There is a detection circuit 27 also formed on the vibrator substrate 21 in the monolithic manner similarly by the photolithography, which is for temperature compensation of the strain gauges 26a to 26d and for arithmetic operations of respective outputs.

A support substrate 28 made of a semiconductor substrate such as silicon is disposed below the vibrator substrate 21, which has in the central portion thereof a support base 29 formed by the anisotropic etching. Further, a plate permanent magnet 30 made of a ferrite or a rare earth magnet is disposed at the lowermost position to provide a magnetic field normally through the vibrator substrate 21. The vibrator substrate 21 and the support substrate 28 are assembled by the anode coupling process, in which the substrates 21, 28 are pressed toward each other at a high temperature of about 400° C. and a high voltage is applied thereto. Then, the permanent magnet 30 and the support substrate 28 are glued to each other with an adhesive.

Figure 4:
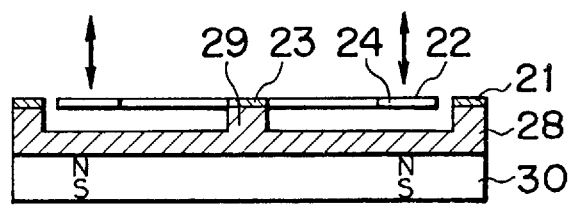
FIG. 4 is a schematic sectional view of the angular velocity sensor as shown in FIG. 3.

FIG. 4 is a sectional view of the angular velocity sensor of FIG. 3 in the assembled state. In FIG. 4, the central portion of the vibrator 22 is fixed on the support base 29, and the both ends thereof, on which the coils for drive 24a and 24b are disposed, can be freely vibrated.

In the above arrangement, when an excitation current is supplied to each of the coils for drive 24a and 24b, the vibrator 22 is repelled or attracted by a magnetic field of the permanent magnet 30 to vibrate in a primary vibration direction perpendicular to a surface of the vibrator substrate 21. The excitation currents are set to coincide with the resonance frequency of the vibrator 22, and directions of the currents flowing through the coils for drive 24a, 24b are arranged to move both ends of the vibrator 22 in the same phase in the Z-direction. Additionally, outputs of the strain gauges 26a to 26d are fed back to the excitation currents to keep an amplitude of the vibrator 22 always constant. In detail, in case that the vibrator 22 is vibrating only in the Z-direction, an output obtained by summing the outputs of the strain gauges 26a, 26b is of the same phase and proportional to a deflection amount of the vibrator to provide an amplitude of Z-direction. In case that the vibrator 22 is vibrating not only in the Z-direction but also in the X-direction, the X-directional vibrations cause one of the strain gauges 26a, 26b to expand but the other to contract, providing respective strains in opposite phase with the same amplitude. When the strains are added, the X-directional vibrations cancel each other and only the Z-directional amplitude is output. A certain amplitude may be kept by feedback of the Z-directional amplitude to the amplitudes of the excitation currents of the coils for drive 24a, 24b. The same is true for the strain gauges 26c, 26d on the other side, in which control is made to keep the amplitude constant.

If an angular velocity Ω of rotation about the Y-axis is applied onto the sensor in that state from the outside, a Coriolis force Fc works in a direction perpendicular to the vibration direction of the vibrator 22, that is, in the X-direction. Then, the vibrator 22 vibrates in the X-direction with an amplitude proportional to the angular velocity Ω of rotation acting on the vibrator vibrating at the resonance frequency. A difference is obtained between outputs of the strain gauges 26a, 26b to remove the same phase components caused by the Z-directional vibrations and extract only outputs of opposite phase components caused by the X-directional vibrations in detection of the X-directional vibrations of the vibrator 22. The difference between the outputs of the strain gauges 26a, 26b is equivalent to an amplitude of the X-directional vibrations. Since the amplitude is proportional to the angular velocity of rotation Ω, the angular velocity of rotation Ω may be detected in the sensor. The above is also the case for the strain gauges 26c, 26d. In order to gain an angular velocity for rotation Ω, detection is necessary for taking out an amplitude from the X-directional vibrations amplitude-modulated. The Z-directional vibration signal and the X-directional vibration signal of the vibrator 22 is synchronously detected to detect the angular velocity of rotation Ω.

Figure 1:
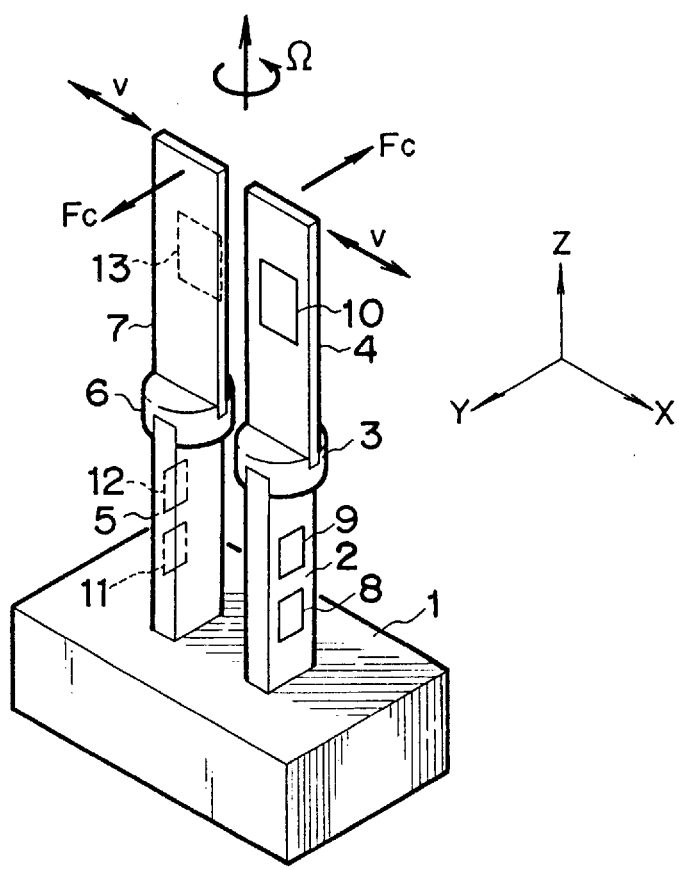
FIG. 1 is a schematic perspective view to show a first example of a conventional angular velocity sensor.
Figure 2:
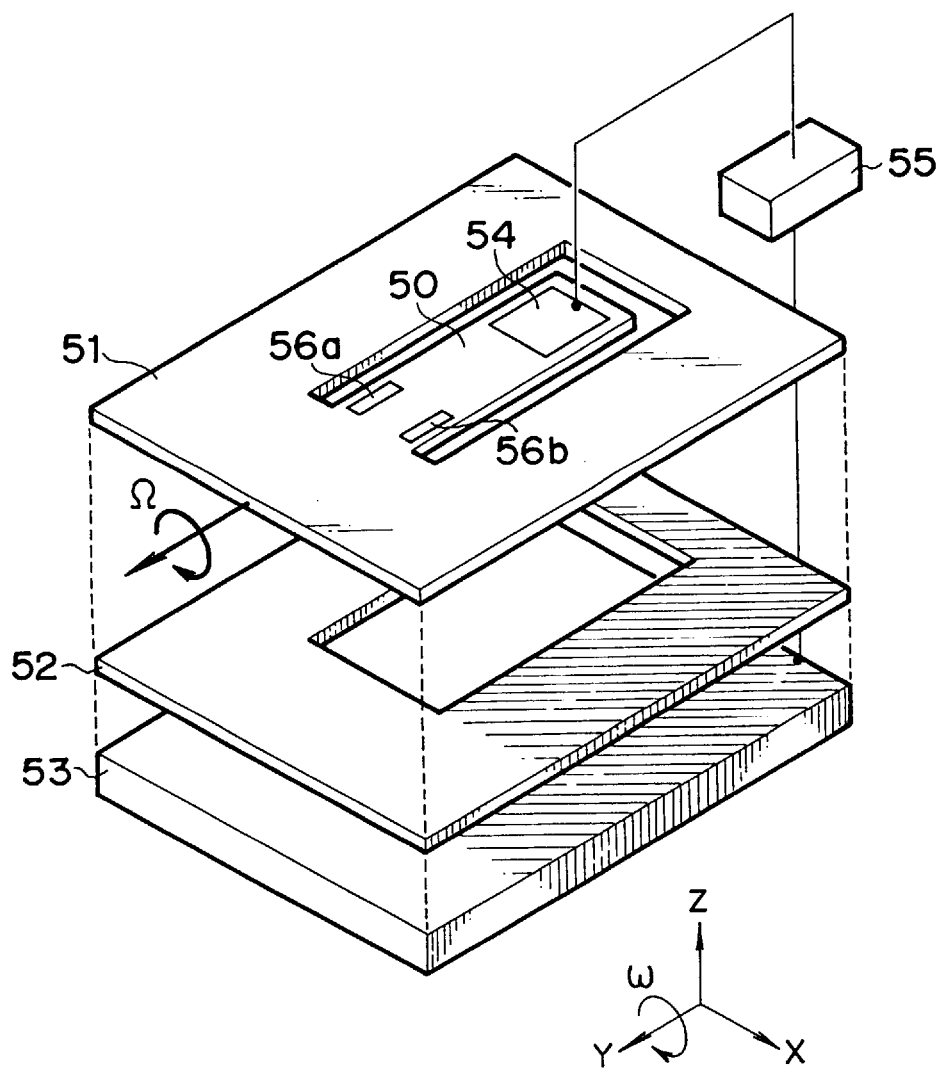
FIG. 2 is a schematic perspective view to show a second example of a conventional angular velocity sensor.
Figure 5:
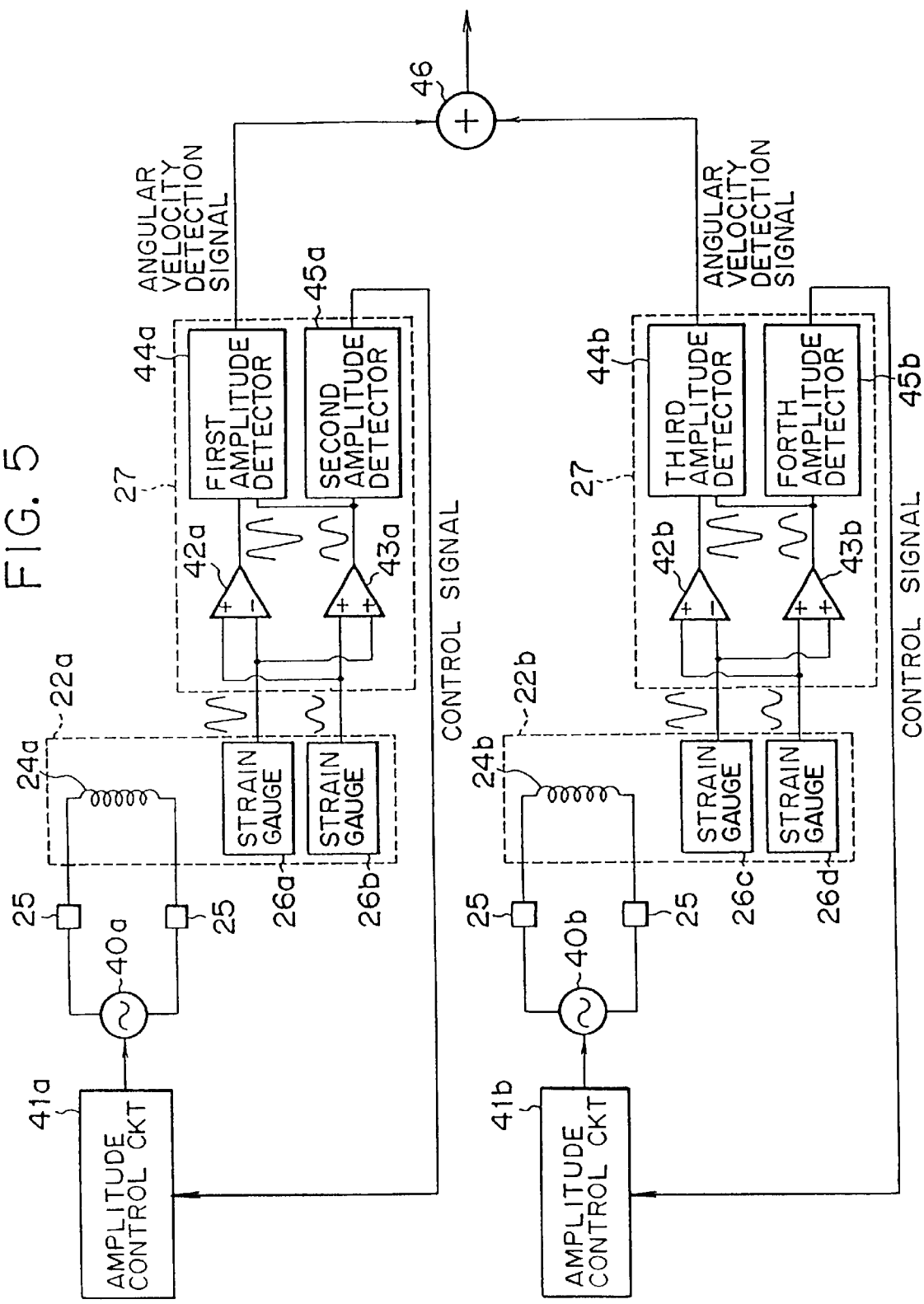
FIG. 5 is a block diagram to show drive and detection circuits of the angular velocity sensor as shown in FIG. 3.

FIG. 5 is a block diagram to show an example of constitution of drive circuits and detection circuits in the first embodiment of the angular velocity sensor according to the present invention. In FIG. 5, the same members are given the same numerals as in FIG. 2. In FIG. 5, an alternating current is supplied from an AC power source 40a through terminals 25 to a coil for drive 24a to vibrate one portion 22a of a vibrator 22. Also, an alternating current is supplied from an AC power source 40b through terminals 25 to a coil for drive 24b to vibrate the other portion 22b of the vibrator 22.

Each of strain gauges 26a and 26b mounted on the portion 22a of the vibrator 22 outputs a signal in which a periodic signal corresponding to the X-directional vibrations and a periodic signal corresponding to the Z-directional vibrations are superposed on each other, as described above. The signals from the strain gauges 26a, 26b are transmitted to a differential amplifier 42a in the detection circuit 27, in which a difference is taken between the signals. The differential amplifier 42a outputs a periodic signal corresponding to the X-directional vibrations. The X-directional vibrations are caused by a Coriolis force in rotation of the substrate 21. Accordingly, an angular velocity detection signal may be obtained by effecting synchronous detection of an amplitude of the output signal of the differential amplifier 42a by use of a Z-directional vibration signal described latter as a reference signal by a first amplitude detector 44a.

A summing amplifier 43a in the detection circuit 27 obtains a sum of the output signals of the strain gauges 26a and 26b to output a periodic signal corresponding to the Z-directional vibrations. The Z-directional vibrations are caused by the coil for drive 24a. Thus, a control signal may be obtained by detecting an amplitude of the output signal of the summing amplifier 43a by a second amplitude detector 45a. The control signal is fed back to the driving means to control an amplitude of the current supplied from the AC power source 40a through an amplitude control circuit 41a to the coil 24a, whereby the portion 22a of the vibrator may be stably vibrated with a constant amplitude.

The same detection as described is carried out with outputs of strain gauges 26c and 26d mounted on the portion 22b of the vibrator. Specifically, a differential amplifier 42b takes a difference between he outputs of the strain gauges 26c and 26d, and an angular velocity detection signal is obtained by synchronously detecting an amplitude of an output signal of the differential amplifier 42b by use of the Z-directional vibration signal as a reference signal by a third amplitude detector 44b. Also, a summing amplifier 43b takes a sum of the outputs of the strain gauges 26c and 26d, and a control signal is obtained by detecting an amplitude of an output signal of the summing amplifier 43b by a fourth amplitude detector 45b. An output signal of the fourth amplitude detector 45b is fed back to an amplitude control circuit 41b to control an amplitude of the output current of the AC power source 40b. The outputs of the first and the third amplitude detectors 44a and 44b can be individually used as respective angular velocity detection signals, or, an adder 46 can serve to add them to provide an output as an angular velocity detection signal as shown in FIG. 5.

Although the coils 24a and 24b are driven by the separate AC power sources 40a and 40b in the above embodiment, they may be driven by a common power source in an alternative arrangement. In the alternative arrangement, the outputs of the second and the fourth amplitude detectors 45a and 45b are added, and an amplitude of an output current of the common power source is controlled based on the sum signal.

In the present embodiment, when the portions 22a and 22b of the vibrator 22 are vibrated, forces caused by reaction to the vibrations become balanced in the portion of the support beam 23 against each other to cause no loss in vibrations. Thus, the portions 22a and 22b may be efficiently driven and the dissipation power of the driving means may be minimized. Further, the X-directional vibrations due to the Coriolis force are not damped, so that the angular velocity may be detected with a high detectivity. In addition, since a moment acting on the support base 29 which serves as the fixed ends of the portion 22a and 22b can be made smaller than that in a case of a cantilever and a load working on the connecting portion to the support base 29 can be also made small, the durability of the sensor may be improved.

Figure 6:
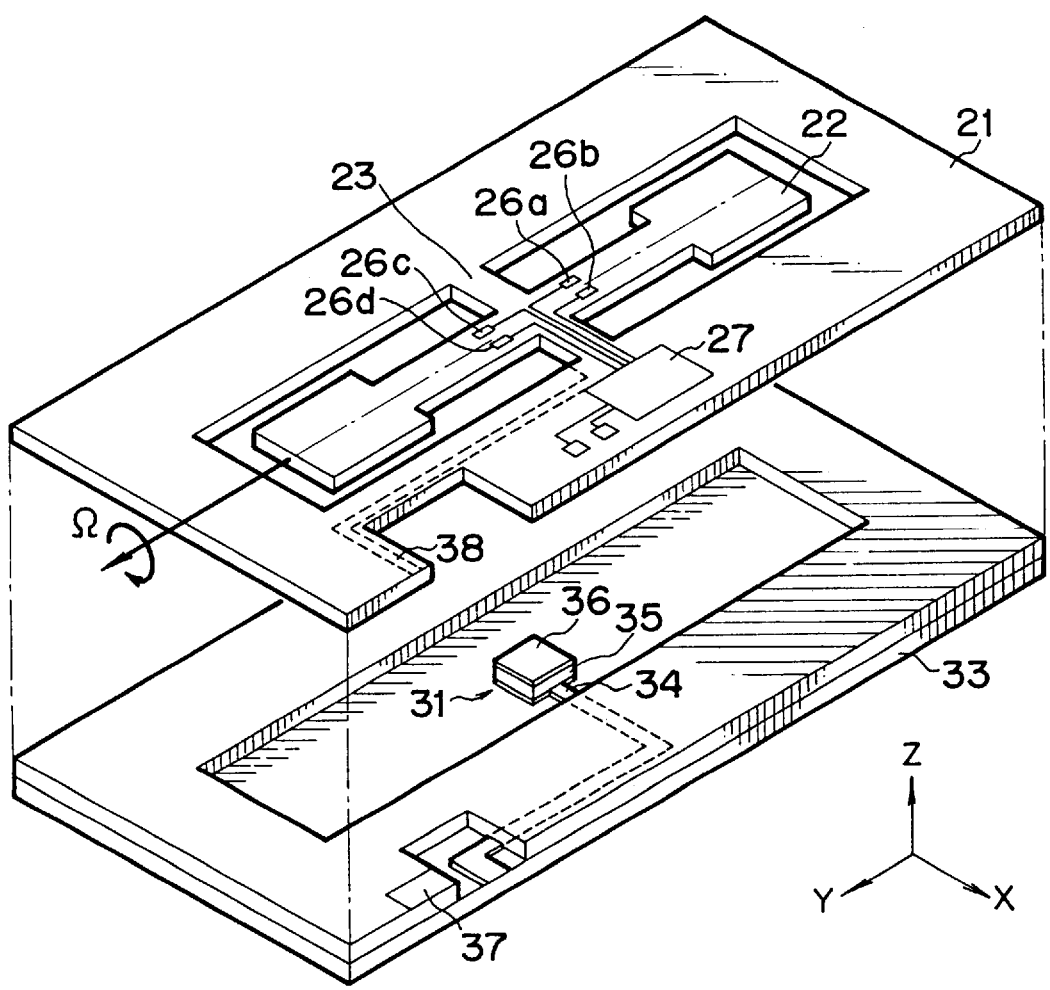
FIG. 6 is an exploded perspective view to show a second embodiment of the angular velocity sensor according to the present invention.
Figure 7:
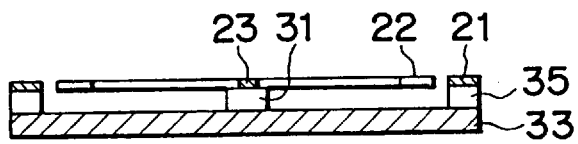
FIG. 7 is a schematic sectional view of the angular velocity sensor as shown in FIG. 6.

FIG. 6 is an exploded perspective view to show a second embodiment of the angular velocity sensor according to the present invention, and FIG. 7 is a sectional view of the angular velocity sensor of FIG. 6 in an assembled state. In the second embodiment, a piezoelectric element drive 31 is substituted for the coils for drive 24a and 24b to vibrate the vibrator 22. The production of the piezoelectric element 31 is as follows: A lower electrode 34 is formed on the substrate 33 by patterning; A piezoelectric layer 35 such as PZT, ZnO, and $Al_3N_4$ is then deposited thereon; An upper electrode 36 and an extraction electrode 37 are formed by patterning; and the piezoelectric layer 35 is finally removed excluding the piezoelectric element drive 31 and the periphery thereof. A pattern of outgoing lines from the electrode 34 are simultaneously formed. An extraction electrode 38 is provided at a position corresponding to the upper electrode 36 on the back plane of the vibrator substrate 21 to connect between the upper electrode 36 and the extraction electrode 37 when coupled with the piezoelectric layer 35.

In the present embodiment, an amplitude voltage is applied to the piezoelectric element drive 31 also serving as a support base to vibrate the vibrator 22. The excitation voltage is controlled at the resonance frequency of the vibrator 22 to keep the amplitude of the vibrator 22 constant based on sum signals of the strain gauges 26a to 26d similarly as in the first embodiment. The use of the piezoelectric element 31 allows the permanent magnet 30 to be omitted and the sensor to be made compact.

Further, a great number of very small sensors may be simultaneously produced in production by the micromechanics, permitting a great reduction in production cost.

In the present embodiment, the detection of the angular velocity is carried out in the same manner as in the first embodiment and the same effect may be enjoyed. Additionally in the present embodiment, a single piezoelectric element provided on the central portion of the vibrator is used to vibrate both ends of the vibrator, so that the angular velocity sensor obtained may be simple in structure and may be operated efficiently.

Figure 8:
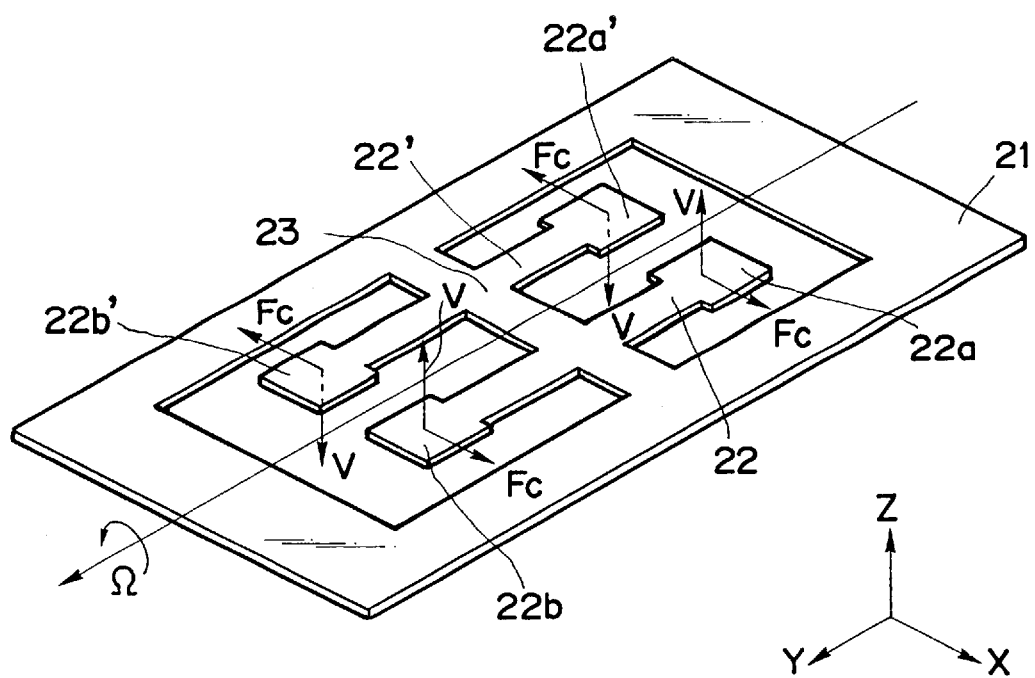
FIG. 8 is a perspective view showing a third embodiment of the angular velocity sensor according to the present invention.

FIG. 8 is a perspective view to show an arrangement of vibrators of a third embodiment. Vibrators 22, 22' parallelly arranged by the photolithography and the anisotropic etching are integrally formed on a vibrator substrate 21 made of a semiconductor substrate such as silicon such that the central portions of the vibrators are supported by a support beam 23. A driving coil not illustrated is provided on each of end portions 22a, 22b, 22a' 22b' of the vibrators 22, 22', in the same manner as in the first embodiment. The vibration driving is performed by the driving coils such that the amplitude of the vibration becomes constant in a Z-direction perpendicular to the surface of the vibrator substrate 21. In this moment, the both end portions 22a, 22b of the vibrator 22 move in the Z-direction with the same phase while both end portions 22a', 22b' of the vibrator 22' move opposite to that of the end portions 22a, 22b with the same phase. Such the movement of the end portions 22a', 22b', 22a , 22b can be realized by adjusting the directions of currents flowing in the driving coils provided on the end portions of the vibrators 22, 22'. Further, strain gauges not illustrated are provided in the vicinity of the support beam 23 of the respective vibrators 22, 22', in the same manner as the first embodiment, so that the vibration of the vibrators 22, 22' in the X-direction can be detected.

When an angular velocity Ω of rotation about the Y-axis is applied from the outside, Coriolis forces Fc work on the end portions 22a, 22b, 22a', 22b' of the vibrators 22, 22' in directions indicated by the arrows in FIG. 8 according to the respective excitation direction in the Z-direction, so that both end portions 22a, 22b of the vibrator 22 and both end portions 22a', 22b' of the vibrator 22' phase oppositely vibrate in the X-direction each other with an amplitude proportional to the angular velocity Ω of rotation. The Z-directional vibration signal and the X-directional vibration signal are detected by the strain gauges not illustrated of the vibrators 22, 22' and the X-directional vibration signal and the Z-directional vibration signal are synchronously detected to detect the angular velocity of rotation in the same manner as the first embodiment.

Since reaction forces against the Coriolis forces Fc occured on the vibrators 22, 22' in the X-direction due to the angular velocity Ω of rotation become balanced through the support beam 23 of the portion between the vibrators 22, 22' by arranging the vibrators 22, 22' parallelly each other, there can be provided an angular velocity sensor according to the third embodiment in which an energy loss of vibration can be minimized and an angular velocity of rotation can be detected with high sensitivity.

Further, a load working on the connecting portion to a supporting base, not illustrated, for fixing the support beam 23 can be made small, so that the durability of the angular velocity sensor can be improved.

The present invention may be applicable to many widely different embodiments in addition to the embodiments as described above. For example, a piezoelectric element may be used as means for detecting vibrations of the vibrator. It should be understood that the present invention includes all such embodiments and modifications without departing from the scope of the appended claims.

What is claimed is:

1. An angular velocity sensor comprising:
   a substrate;
   a vibrating member of an elongate plate formed on part of said substrate and extending in a longitudinal direction along a first axis, said vibrating member having first and second longitudinal ends extending from a central portion in opposite directions along the first axis;
   a support beam whose longitudinal axis extends along a second axis perpendicular to the longitudinal direction of said vibrating member, said support beam being formed on part of said substrate to support said vibrating member at said central portion along the second axis between said first and second longitudinal ends of said vibrating member;
   driving means for driving both of said longitudinal ends of said vibrating member to vibrate in a first direction perpendicular to a surface of said substrate; and
   detecting means for detecting vibrations of said vibrating member in a second direction perpendicular to said first direction to detect an angular velocity of rotation of said substrate,
   wherein said first and second longitudinal ends of said vibrating member are positioned opposite to each other with respect to said support beam.

2. An angular velocity sensor according to claim 1, wherein said driving means comprises first and second coils provided on said first and second longitudinal ends of said vibrating member, a permanent magnet applying a magnetic field to said first and second coils, and a power source for supplying an alternating current to said first and second coils.

3. An angular velocity sensor according to claim 1, wherein said driving means comprises a piezoelectric element provided at a center of said vibrating member in the longitudinal direction thereof.

4. An angular velocity sensor according to claim 1, wherein said detecting means comprises a first strain gauge unit formed on one side of said vibrating member with respect to a center thereof, a second strain gauge unit formed on the other side of said vibrating member with respect to the center, and a detection circuit for detecting an amplitude of the vibrations of said vibrating member from outputs of said first and second strain gauge units.

5. An angular velocity sensor according to claim 4, wherein said substrate is a semiconductor and part of said substrate is doped with an impurity to provide said first and second strain gauge units.

6. An angular velocity sensor according to claim 5, wherein said detection circuit is formed in a part of said substrate in a monolithic manner.

7. An angular velocity sensor according to claim 4, wherein said first strain gauge unit comprises first and second strain gauges formed on said vibrating member as juxtaposed in the second direction, wherein said second strain gauge unit comprises third and fourth strain gauges formed on said vibrating member as juxtaposed in the second direction, and wherein said detection circuit comprises a first differential circuit for obtaining a difference between outputs of said first and second strain gauges, a first amplitude detector for detecting an amplitude of an output signal of said first differential circuit, a first summing circuit for obtaining a sum of outputs of said first and second strain gauges, a second amplitude detector for detecting an amplitude of an output signal of said first summing circuit, a first feedback circuit for conducting feedback of an output signal of said second amplitude detector to said driving means, a second differential circuit for obtaining a difference between outputs of said third and fourth strain gauges, a third amplitude detector for detecting an amplitude of an output signal of said second differential circuit, a second summing circuit for obtaining a sum of the outputs of said third and fourth strain gauges, a fourth amplitude detector for detecting an amplitude of an output signal of said second summing circuit, and a second feedback circuit for conducting feedback of an output signal of said fourth amplitude detector to said driving means.

8. An angular velocity sensor according to claim 1, wherein said substrate is a semiconductor and said vibrating member and said support beam are etched on said substrate.

9. An angular velocity sensor comprising:
   a substrate:
      a first cantilever beam formed on part of said substrate and having a first fixed end and a first cantilevered vibrating end;
      a second cantilever beam formed on part of said substrate and having a second fixed end and a second cantilevered vibrating end, said first and second cantilever beams formed to be symmetrical with each other and having a central portion at said fixed ends,
      wherein a longitudinal direction of said first cantilever beam is oriented along a first axis and in the same direction as a longitudinal direction of said second cantilever beam, wherein the first and second cantilevered vibrating ends are on opposite ends from each other in the longitudinal directions of said first and second cantilever beams;
      a support beam whose longitudinal axis extends along a second axis perpendicular to the longitudinal directions of said first and second cantilever beams, said support beam supporting the first and second fixed ends at said central portion along the second axis between the first and second fixed ends;
      driving means for driving said vibrating ends of said first and second cantilever beams to vibrate in a first direction perpendicular to a surface of said substrate; and detecting means for detecting vibrations of said first and second cantilever beams in a second direction perpendicular to the first direction to detect an angular velocity of rotation of said substrate.

10. An angular velocity sensor according to claim 9, wherein said driving means comprises first and second coils provided on said vibrating ends of said first and second cantilever beams, respectively, a permanent magnet for applying a magnetic field to said first and second coils, and a power source for supplying an alternating current to said first and second coils.

11. An angular velocity sensor according to claim 9, wherein said driving means comprises a piezoelectric element mounted midway between said first and the second cantilever beams.

12. An angular velocity sensor according to claim 9, wherein said detecting means comprises a first strain gauge unit formed on said first cantilever beam, a second strain gauge unit formed on said second cantilever beam, and a detection circuit for detecting an amplitude of the vibrations of said first and second cantilever beams from outputs of said first and second strain gauge units.

13. An angular velocity sensor according to claim 12, wherein said substrate is a semiconductor and part of said substrate is doped with an impurity to provide said first and second strain gauge units.

14. An angular velocity sensor according to claim 13, wherein said detection circuit is formed in a part of said substrate in a monolithic manner.

15. An angular velocity sensor according to claim 12, wherein said first strain gauge unit comprises first and second strain gauges formed on said first cantilever beam as juxtaposed in the second direction, and said second strain gauge unit comprises third and fourth strain gauges formed on said second cantilever beam as juxtaposed in the second direction, and wherein said detection circuit comprises a first differential circuit for obtaining a difference between outputs of said first and second strain gauges, a first amplitude detector for detecting an amplitude of an output signal of said first differential circuit, a first summing circuit for obtaining a sum of the outputs of said first and second strain gauges, a second amplitude detector for detecting an amplitude of an output signal of said first summing circuit, a first feedback circuit for conducting feedback of an output signal of said second amplitude detector to said driving means, a second differential circuit for obtaining a difference between outputs of said third and fourth strain gauges, a third amplitude detector for detecting an amplitude of an output signal of said second differential circuit, a second summing circuit for obtaining a sum of the outputs of said third and fourth strain gauges, a fourth amplitude detector for detecting an amplitude of an output signal of said second summing circuit, and a second feedback circuit for conducting feedback of an output signal of said fourth amplitude detector to said driving means.

16. An angular velocity sensor according to claim 9, wherein said substrate is a semiconductor and wherein said first and second cantilever beams are etched on said substrate.

* * * * *

UNITED STATES PATENT AND TRADEMARK OFFICE
CERTIFICATE OF CORRECTION

PATENT NO. : 5,889,208

DATED : March 30, 1999

INVENTOR(S) : Nose

It is certified that error appears in the above-identified patent and that said Letters Patent is hereby corrected as shown below:

COLUMN 2:

Line 34, "in" should read --in a--.

COLUMN 5:

Line 22, "he" should read --the--.

Signed and Sealed this

Fifteenth Day of February, 2000

Attest:

Q. TODD DICKINSON

Attesting Officer    Commissioner of Patents and Trademarks